(12) United States Patent
Wollmer

(10) Patent No.: US 6,234,265 B1
(45) Date of Patent: May 22, 2001

(54) IGNITION COIL COVER

(75) Inventor: James A. Wollmer, Menomonee Falls, WI (US)

(73) Assignee: Harley-Davidson Motor Company, Milwaukee, WI (US)

( * ) Notice: Subject to any disclaimer, the term of this patent is extended or adjusted under 35 U.S.C. 154(b) by 0 days.

(21) Appl. No.: 09/363,458

(22) Filed: Jul. 29, 1999

(51) Int. Cl.$^7$ .............................. B60K 11/04; B62D 61/02
(52) U.S. Cl. ........................................... 180/219; 180/68.6
(58) Field of Search .................................... 180/219, 68.4, 180/68.6; 403/321, 322.1, 322.4, 325, 326, 329; 150/157, 167

(56) References Cited

U.S. PATENT DOCUMENTS

| | | | | |
|---|---|---|---|---|
| 3,944,009 | * | 3/1976 | Katagiri ............................... | 180/219 |
| 4,169,512 | * | 10/1979 | Ishikawa et al. ..................... | 180/205 |
| 4,685,530 | * | 8/1987 | Hara .................................... | 180/68.4 |
| 5,176,111 | * | 1/1993 | Nakamura et al. .................. | 180/229 |
| 5,211,255 | * | 5/1993 | Fukuda ................................ | 180/68.4 |
| 5,554,891 | * | 9/1996 | Shimizu et al. ..................... | 180/287 |
| 5,595,257 | * | 1/1997 | Yoshida et al. ...................... | 180/287 |

OTHER PUBLICATIONS 1993 and 1994 1340 Models Parts Catalog, pp. 34 and 35.
1999 Custom Chrome Catalog, pp. 2.18 and 7.17–7.22.
1997 J & P Cycles, pp. 1–21.1.24.
1993 Uniquely V–Twin Manufacturing Catalog, p. 445.

* cited by examiner

*Primary Examiner*—Brian L. Johnson
*Assistant Examiner*—Matthew Luby
(74) *Attorney, Agent, or Firm*—Michael Best & Friedrich LLP

(57) ABSTRACT

The present invention is directed to a motorcycle that includes a frame, a transmission case, an upper support, an ignition coil and a cover. The transmission case is coupled to a lower portion of the frame and the upper support extends from the transmission case to an upper portion of the frame. The ignition coil is mounted on the upper support, and the cover is secured over the ignition coil. In one aspect, the ignition coil is secured to the upper support and the cover is positioned over the ignition coil such that a projection on the cover is inserted into an opening in the upper support. The projection on the cover makes it easier to assemble the cover to the upper support because there are no assembly tools needed to insert the projection into the opening. The projection also facilitates alignment of the cover with respect to the frame and/or the ignition coil. There is no visible mounting hardware on the ignition cover after the cover is attached to the motorcycle frame.

19 Claims, 4 Drawing Sheets

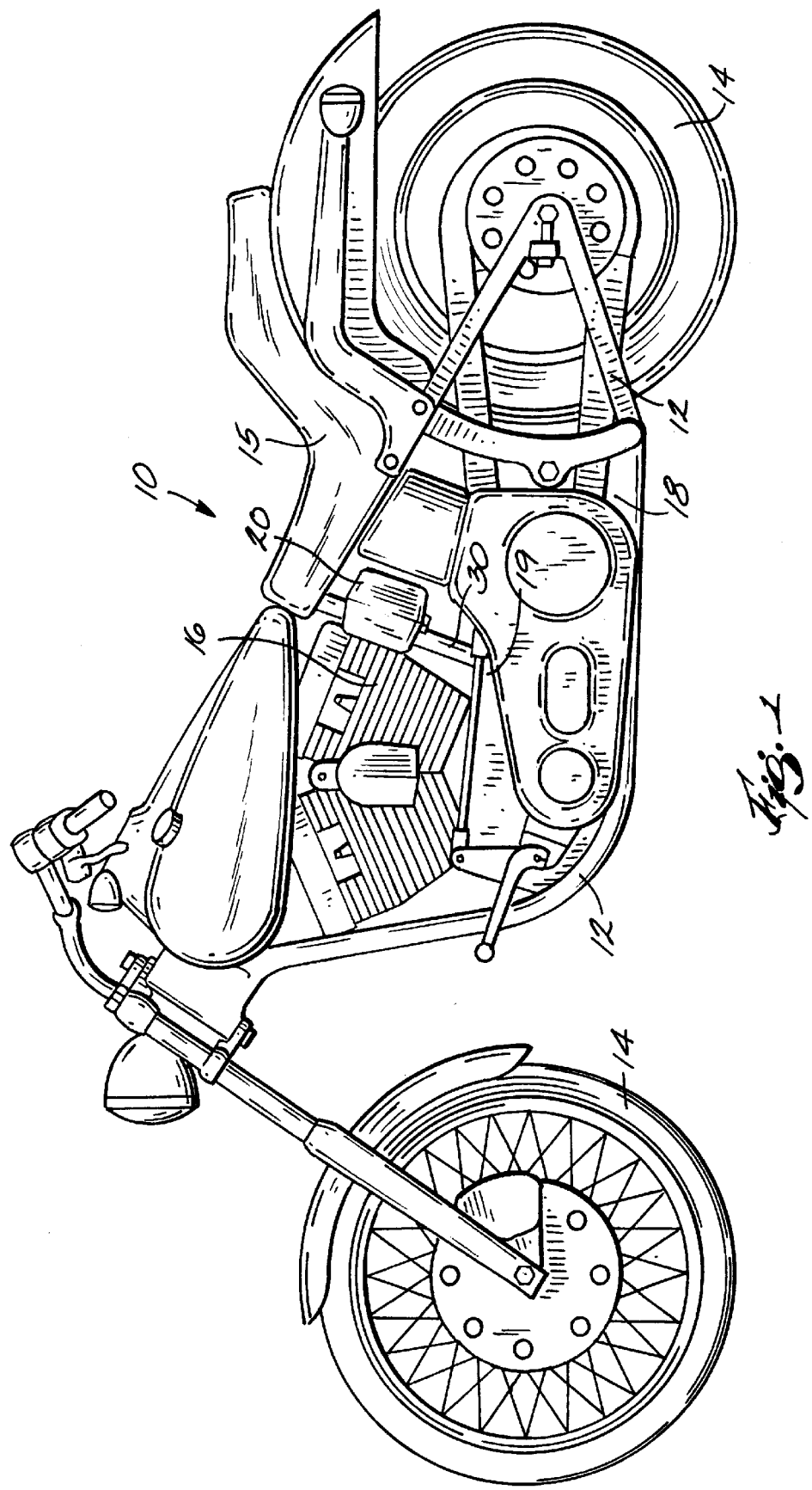

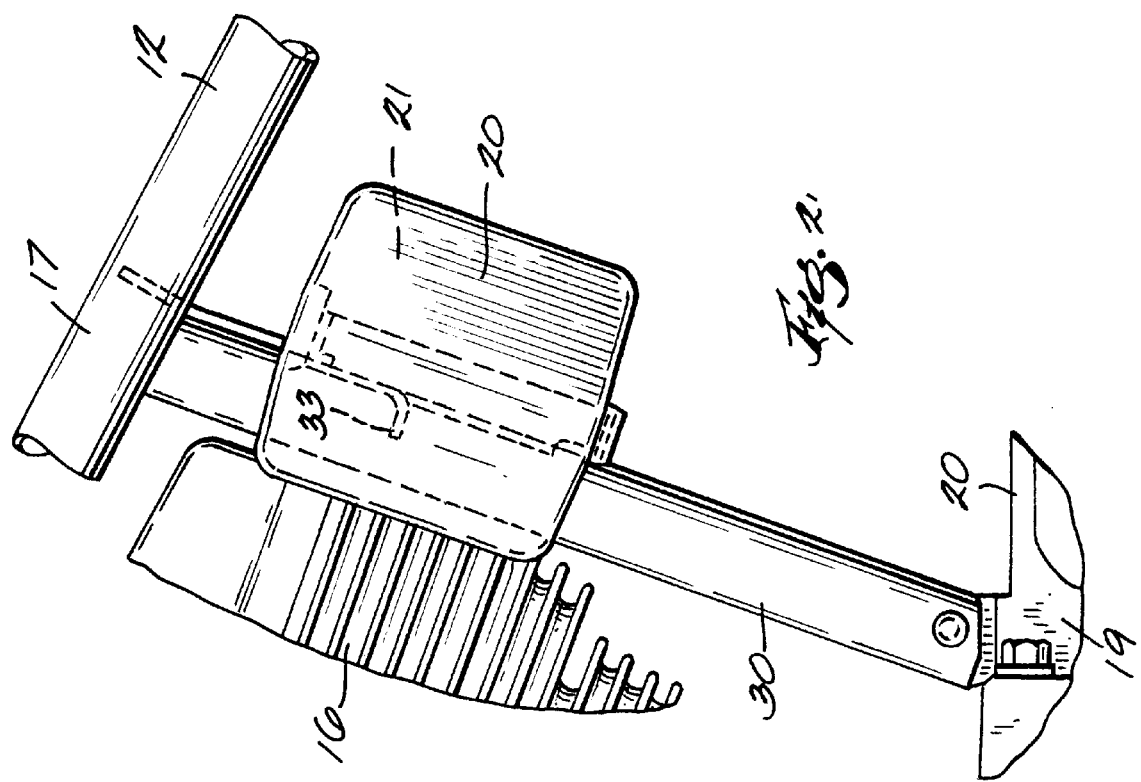

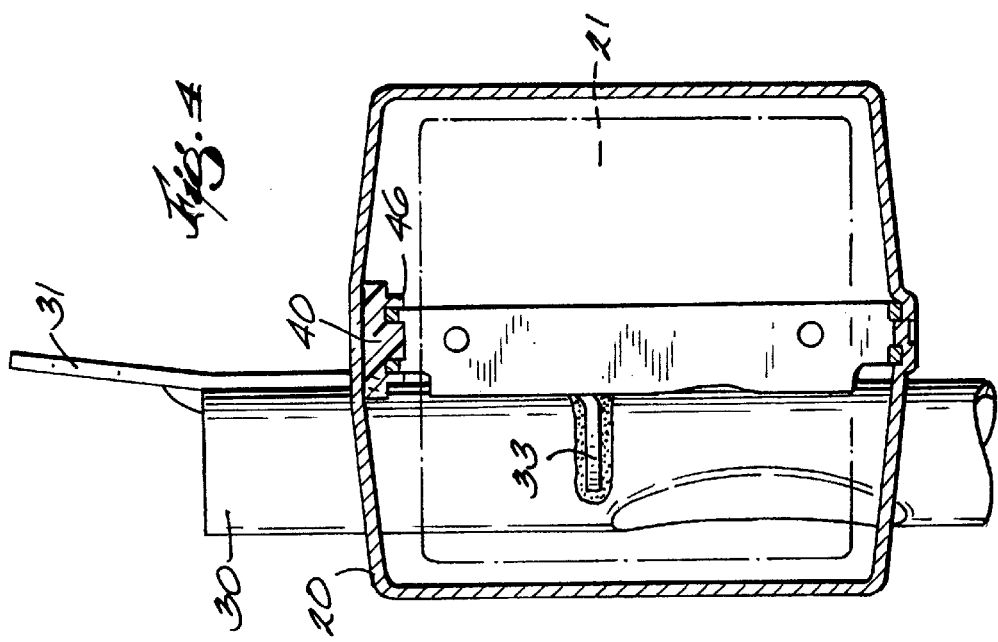
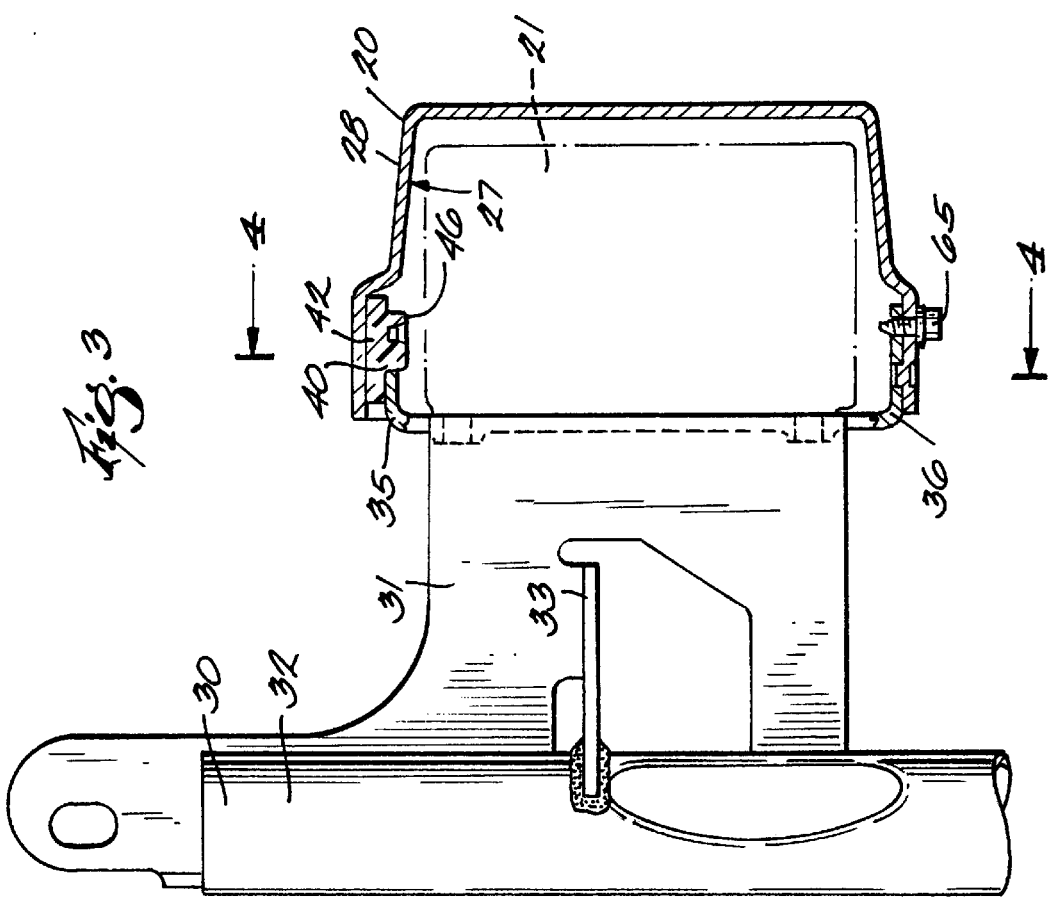

IGNITION COIL COVER

FIELD OF THE INVENTION

This invention relates to motorcycles, and more particularly to a cover for an ignition coil on a motorcycle.

BACKGROUND OF THE INVENTION

Motorcycle owners typically place a premium on the aesthetic appearance of their motorcycles such that manufacturers are constantly trying to enhance the image of their products. One technique used by manufacturers to augment the appearance of a motorcycle is to cover certain parts of the motorcycle with more aesthetically-pleasing covers.

One of the parts commonly covered on the motorcycle is an ignition coil. The ignition coil is usually mounted to the motorcycle using conventional mounting hardware that is in plain view once the cover is assembled over the ignition coil.

SUMMARY OF THE INVENTION

Mounting a cover onto an ignition coil is difficult because the ignition coil is awkwardly shaped. There is also usually a limited amount of space in which to mount the cover onto the ignition coil. The limited space makes it difficult to maneuver the cover and any assembly tools into locations that facilitate assembling the cover over the ignition coil. The visible mounting hardware commonly used to secure ignition coil covers detracts from the external appearance of the motorcycle.

The present invention addresses the above-noted considerations by providing a motorcycle that includes an ignition coil cover that is (i) inexpensive to manufacture; (ii) readily mounted over an ignition coil; and (iii) improves the appearance of the motorcycle by eliminating any visible mounting hardware.

In the illustrated embodiment, the present invention provides a motorcycle that includes a frame, a transmission case, an upper support, an ignition coil and a cover. The transmission case is mounted to a lower portion of the frame, and the upper support extends from the transmission case to an upper portion of the frame. The ignition coil is mounted on the upper support, and the cover is secured over the ignition coil by attaching the cover to the upper support.

In another aspect, the present invention provides a motorcycle that includes a frame, an ignition coil and a cover. The ignition coil is secured to the frame and the cover is positioned over the ignition coil. The cover is secured to the frame by inserting a projection on the cover into an opening in the frame. The projection on the cover makes it easier to assemble the cover to the frame because there are no assembly tools needed to insert the projection into the opening in the frame. In addition, the projection facilitates alignment of the cover with respect to the frame and/or the ignition coil.

Other principle advantages of the invention would become apparent to those skilled in the art upon review of the following drawings, the detailed description and the attached claims.

BRIEF DESCRIPTION OF THE DRAWINGS

FIG. 1 is a side view of a motorcycle embodying the present invention.

FIG. 2 is an enlarged side view of the area of the motorcycle of FIG. 1 that includes the ignition coil cover.

FIG. 3 is an enlarged partially sectioned front view of the ignition coil cover of FIG. 2.

FIG. 4 is a section view of the ignition coil cover taken along line 4—4 of FIG. 3.

DETAILED DESCRIPTION

Figure 6:
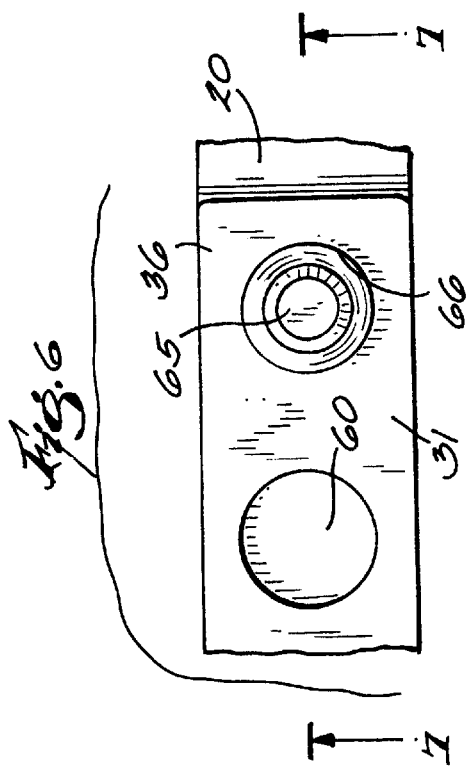
FIG. 6 is a top view of the connection between the lower portion of the ignition coil cover and a bracket that is secured to the motorcycle support.

The illustrated motorcycle 10 includes a frame 12, wheels 14, a seat 15, an engine 16, a transmission casing 19 and an ignition coil cover 20 for covering an ignition coil (FIGS. 2–4). As shown more clearly in FIG. 2, the cover 20 is mounted to an upper support 30 secured at an upper end to an upper portion 17 of the frame 12 and at a lower end to the transmission casing 19. The transmission casing 19 is secured to the engine 16 and to a lower portion 18 of the frame 12.

Referring to FIGS. 3 and 4, the support 30 includes a bracket 31 having a flange 33 that is welded to a main body 32 of the support 30. The bracket 31 supports the ignition coil 21. The cover 20 is connected to an upper extension 35 and a lower extension 36 on the bracket 31 (see FIG. 3) such that the cover 20 is positioned about the ignition coil 21.

Figure 5:
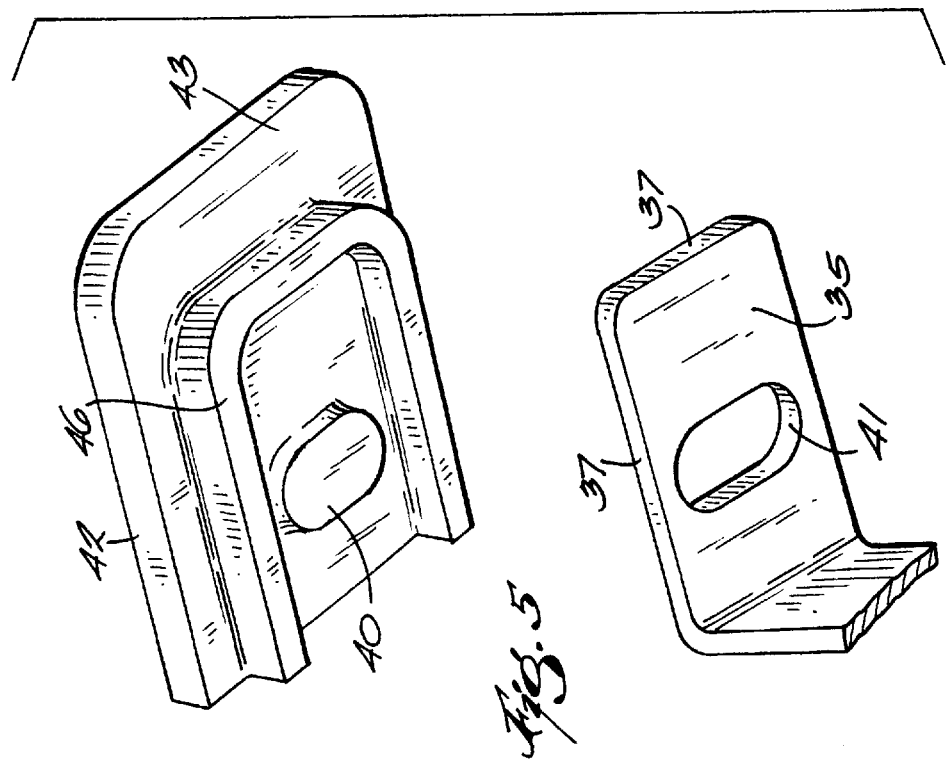
FIG. 5 is an exploded perspective view of the connection between an upper portion of the cover and a bracket that is secured to a motorcycle support.

The cover 20 is secured to the upper extension 35 by inserting an oblong projection 40 into an oblong opening 41 (see FIG. 5). The oblong projection 40 extends from a bottom surface 43 on a resilient insert 42. The resilient insert 42 is secured to an inside surface 27 on a top section 28 of the cover 20. Inserting the projection 40 into the opening 41 is particularly convenient because no assembly tools are required to perform the operation. In addition, the resilient nature of the insert 42 allows the cover 20 to be manipulated into the proper position as the cover 10 is attached to the bracket 31. The resilient insert 42 can be any suitable material, such as rubber, an elastomer, etc.

The resilient insert 42 also includes an emboss 46 that extends from the bottom surface 43 of the insert 42. The emboss 46 engages the peripheral edge 37 of the upper extension 35. The emboss 46 further facilitates alignment of the cover 20 and the bracket 31. In addition, the emboss 46 provides additional stability once the cover 20 is secured to the upper extension 35 of the bracket 31.

Figure 7:
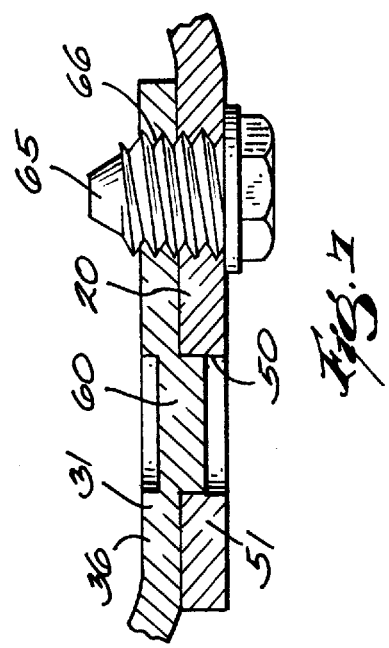
FIG. 7 is a section view taken along line 7—7 in FIG. 6.

The cover 20 is attached to the lower extension 36 by placing a slotted opening 60 in the lower section 51 of the cover 20 about the lower extension 36 of the bracket 31 (see FIGS. 6–7). The lower section 51 of the cover 20 is also secured to the lower extension 36 by a fastener 65 that extends through the cover 20 into a threaded hole 66 in the lower extension 36.

The present invention also relates to a method for securing an ignition coil cover 20 over an ignition coil 21 that is connected to a motorcycle 10. The motorcycle 10 includes a frame 12 and a transmission case 19 mounted to the frame 12. The method includes the steps of interconnecting an upper support 30 between the transmission case 19 and the frame 12; mounting the ignition coil 21 to the upper support 30; placing the ignition coil cover 20 over the ignition coil 21; and coupling the cover 20 to the upper support 30.

The cover 20 includes a projection 40 located on an upper portion 43, and the upper support 30 includes a bracket 31 having an opening 41 that is adapted to receive the projection 40 when the cover 20 is assembled to the bracket 31.

Coupling the cover 20 to the upper support 30 further includes pivoting the cover 20 to secure a lower section 51 of the cover 20 about a lower extension 36 on the bracket 31. The lower section 51 on the cover 20 includes a slotted opening 50 that is positioned about the lower extension 36 on the bracket 31.

It should be noted that securing the lower section 51 of the cover 20 to the lower extension 36 of the bracket 31 may be enhanced by inserting a fastener 65 through the cover 20 into a threaded hole 66 in the lower extension 36 of the bracket 31 without departing from the scope of the present invention.

The foregoing description of the present invention has been presented for purposes of illustration and description. Consequently, variations and modifications commensurate with the above teachings, and the skill and knowledge of the relevant art, are within the scope of the present invention. The embodiments described herein are further intended to explain best modes known for practicing the invention and to enable other skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A motorcycle comprising:
   a frame having an upper portion and a lower portion;
   a transmission casing coupled to said lower portion of said frame;
   an upper support coupled to said upper portion of said frame and said transmission casing;
   an ignition coil coupled to said upper support; and
   a cover coupled to said upper support over said ignition coil.

2. The motorcycle of claim 1 further comprising a seat coupled to said frame, wherein said upper support is secured to said upper portion of said frame underneath said seat.

3. The motorcycle of claim 1, wherein said upper support is secured to an upper surface of said transmission casing.

4. The motorcycle of claim 1, wherein said upper support includes a bracket and said ignition coil is secured to said bracket.

5. A motorcycle comprising:
   a frame;
   an ignition coil coupled to said frame;
   a bracket coupled to said frame and positioned adjacent said ignition coil;
   a cover coupled to said bracket such that said cover is positioned over said ignition coil, one of said cover and said bracket including a projection that is inserted into an opening in the other of said cover and said bracket.

6. The motorcycle of claim 5, wherein said projection is on said cover.

7. The motorcycle of claim 6, wherein said cover includes an upper portion and said projection extends from said upper portion.

8. The motorcycle of claim 6, wherein said cover includes an inside surface and said projection extends from said inside surface.

9. The motorcycle of claim 5, wherein said projection is elliptical.

10. The motorcycle of claim 5, wherein said projection comprises a resilient material.

11. The motorcycle of claim 6, wherein said cover includes an emboss extending from said cover such that said emboss engages a peripheral edge on said bracket when said projection is inserted into said opening in said bracket.

12. The motorcycle of claim 5, wherein said bracket extends into a slotted opening in the cover.

13. The motorcycle of claim 12, wherein said cover includes a lower portion and said slotted opening is in said lower portion of said cover.

14. The motorcycle of claim 13, wherein said cover includes an additional opening for receiving a fastener used to secure said cover to said bracket.

15. A method for securing an ignition coil cover over an ignition coil that is connected to a motorcycle having a frame and a transmission case coupled to said frame, said method comprising the steps of:
   interconnecting an upper support between the transmission case and the frame;
   mounting an ignition coil to the upper support;
   placing the cover over the ignition coil; and
   coupling the cover to the upper support.

16. The method of claim 15, wherein the cover includes a projection on an upper portion, wherein the upper support includes a bracket having an opening, and wherein said coupling step includes inserting the projection into the opening.

17. The method of claim 16, wherein said coupling step further includes the steps of pivoting the cover and securing a lower portion of the cover to the support bracket.

18. The method of claim 17, wherein the lower portion of the cover includes an opening and the bracket includes a detent, and wherein said securing step includes inserting the detent into the opening.

19. The method of claim 18, wherein said securing step further includes the step of inserting a fastener through aligned openings in the cover and the bracket.

* * * * *